United States Patent [19]
Heimann et al.

[11] Patent Number: 5,242,108
[45] Date of Patent: Sep. 7, 1993

[54] CONTROL KNOB FOR THERMOSTATICALLY REGULATED MIXING VALVE

[75] Inventors: Bruno Heimann, Fröndenberg-Ardey; Christian Frankholz, Schwerte, both of Fed. Rep. of Germany

[73] Assignee: Friedrich Grohe Aktiengesellschaft, Hemer, Fed. Rep. of Germany

[21] Appl. No.: 969,127

[22] Filed: Oct. 30, 1992

[30] Foreign Application Priority Data

Dec. 18, 1991 [DE] Fed. Rep. of Germany ....... 4141789

[51] Int. Cl.⁵ ............................................. G05D 23/13
[52] U.S. Cl. ..................................... 236/12.16; 236/42
[58] Field of Search ................... 236/12.1, 12.16, 42, 236/43

[56] References Cited

U.S. PATENT DOCUMENTS

| 4,304,358 | 12/1981 | Riis | 236/12.1 |
|---|---|---|---|
| 4,508,262 | 4/1985 | Pedersen et al. | 236/42 |
| 4,508,263 | 4/1985 | Pedersen et al. | 236/42 |
| 4,739,793 | 4/1988 | Vollmer | 236/42 |
| 5,143,286 | 9/1992 | Hansen et al. | 236/42 |

FOREIGN PATENT DOCUMENTS

1164779 9/1964 Fed. Rep. of Germany .
3530812A1 3/1987 Fed. Rep. of Germany .

*Primary Examiner*—William E. Tapolcai
*Attorney, Agent, or Firm*—Herbert Dubno; Andrew Wilford

[57] ABSTRACT

A control assembly used on a thermostatically regulated mixing valve has a housing extending along an axis and a stem in the housing axially displaceable to adjust the thermostatically regulated temperature of the valve. The assembly has a nut threaded on the housing, axially linked to the valve stem, and rotatable about the axis in one direction to move axially inward and move the stem axially inward and rotatable in the opposite direction to move axially outward and move the stem axially outward. An abutment sleeve engageable over the valve housing is formed with a radially outwardly open passage and interengaging formations on the abutment sleeve and valve housing rotationally couple same together. The housing is formed in the sleeve with a radially outwardly open groove level with the passage and a clip engages through the passage with the groove and axially couples the sleeve to the valve housing. A sleevelike knob engaged over the nut and abutment sleeve is formed with a radially throughgoing aperture and the adjustment sleeve is formed level with the aperture with a radially outwardly open seat. Interengaging formations on the knob and on the nut rotationally couple same together but permit relative axial movement so that the knob rotates with the nut but does not move axially therewith. A retaining element engaged radially in the aperture of the knob and in the seat of the adjustment sleeve retains the adjustment sleeve and knob against relative axial displacement.

10 Claims, 4 Drawing Sheets

5,242,108

CONTROL KNOB FOR THERMOSTATICALLY REGULATED MIXING VALVE

FIELD OF THE INVENTION

The present invention relates to a thermostatically regulated mixing valve. More particularly this invention concerns a control knob for such a valve.

BACKGROUND OF THE INVENTION

A standard thermostatically regulated valve such as described in German patent 3,530,812 filed August 29, 1985 by J. Kostorz has hot- and cold-water inlets connected to respective valve seats whose other sides open into an outlet compartment from which tempered water flows. A double valve body is displaceable in one direction to increase the flow from one of the inlets to the outlet compartment and decrease the flow from the other inlet and is oppositely movable for the opposite effect. This valve body can be moved by axially displacing an externally displaceable stem, and is also provided with a temperature-sensitive element in the outlet compartment that ca change length to move the valve element and keep it at the setting it is originally put into. Thus once a given mixed-water temperature is set, the temperature-sensitive element will automatically move the valve bodies in response, for instance, to varying supply temperatures to keep the output temperature steady.

The manual setting of such a valve is typically by means of a simple knob threaded on the rotatable and axially displaceable valve stem. Thus as the temperature is adjusted, the knob is screwed axially along the stem. This change in axial as well as angular position is disadvantageous in that it makes it impossible for a pointer on the valve to align accurately with a scale fixed relative to the valve stem.

German patent 1,164,779 of F. Bayer describes a thermostatic valve where the rotary control knob does not move axially as the valve is adjusted. The mechanism of this valve, however, does not otherwise correspond to the above-described valve with an axially movable stem so that this type of knob cannot be adapted to it.

OBJECTS OF THE INVENTION

It is therefore an object of the present invention to provide an improved control knob for thermostatically regulated valve of the above-described type.

Another object is the provision of such an improved control knob for a thermostatically regulated valve of the above-described type which overcomes the above-given disadvantages, that is which does not move axially as temperature is adjusted, and that is easy to mount on the valve and remove therefrom.

SUMMARY OF THE INVENTION

The instant invention is a control assembly used on a thermostatically regulated mixing valve having a housing extending along an axis and a stem in the housing axially displaceable to adjust the thermostatically regulated temperature of the valve. The assembly has a nut threaded on the housing, axially linked to the valve stem, and rotatable about the axis in one direction to move axially inward and move the stem axially inward and rotatable in the opposite direction to move axially outward and move the stem axially outward. An abutment sleeve engageable over the valve housing is formed with a radially outwardly open passage and interengaging formations on the abutment sleeve and valve housing rotationally couple same together. The housing is formed in the sleeve with a radially outwardly open groove level with the passage and a clip engages through the passage with the groove and axially couples the sleeve to the valve housing. A sleeve-like knob engaged over the nut and abutment sleeve is formed with a radially throughgoing aperture and the adjustment sleeve is formed level with the aperture with a radially outwardly open seat. Interengaging formations on the knob and on the nut rotationally couple same together but permit relative axial movement so that the knob rotates with the nut but does not move axially therewith. A retaining element engaged radially in the aperture of the knob and in the seat of the adjustment sleeve retains the adjustment sleeve and knob against relative axial displacement.

This system is therefore extremely simple, yet holds together solidly The knob does not move axially at all as the temperature is adjusted, and the devices holding the structure together are normally concealed.

According to the invention the clip is made of wire and has two elastically deformable legs that embrace the valve housing. It is hairpin-shaped and has two legs formed with concavely confronting arcuate portions that complementarily embrace the valve housing. The retaining element is part of a flexible split ring formed with a plurality of such retaining tabs projecting radially inwardly from the split ring. The knob is formed with respective radially throughgoing slots for the retaining tabs. The retaining tabs and ring are unitarily formed of a synthetic resin and the knob includes a cover engaging over and around the retaining ring. The seat is an annular radially outwardly open groove formed in the sleeve and the retaining element and clip are contained in and concealed by the knob.

More particularly the knob includes a cover ring engaged over the ring and knob and covering the retaining element, and a cover cap releasably fixed to the knob and pressing the cover ring down onto the knob.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
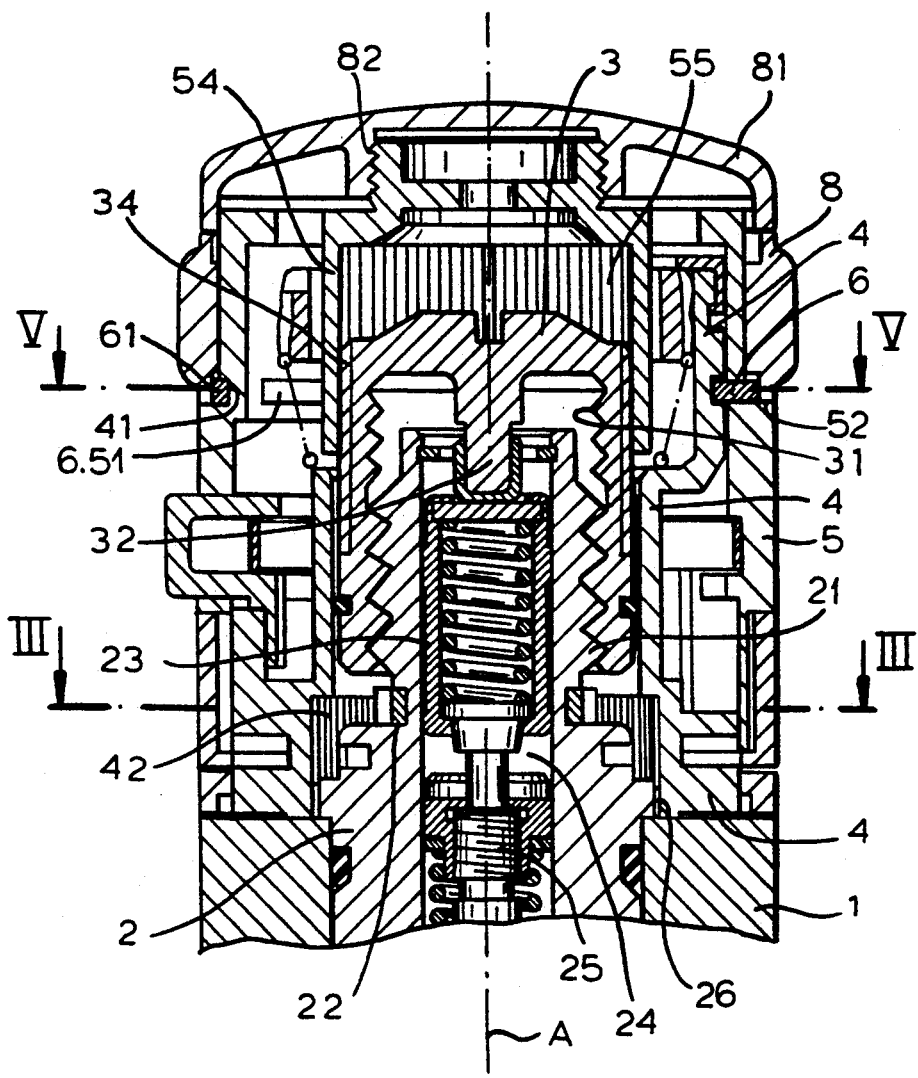
FIGS. 1 and 2 are axial sections taken through 90° offset planes through the control knob assembly of this invention.
Figure 2:
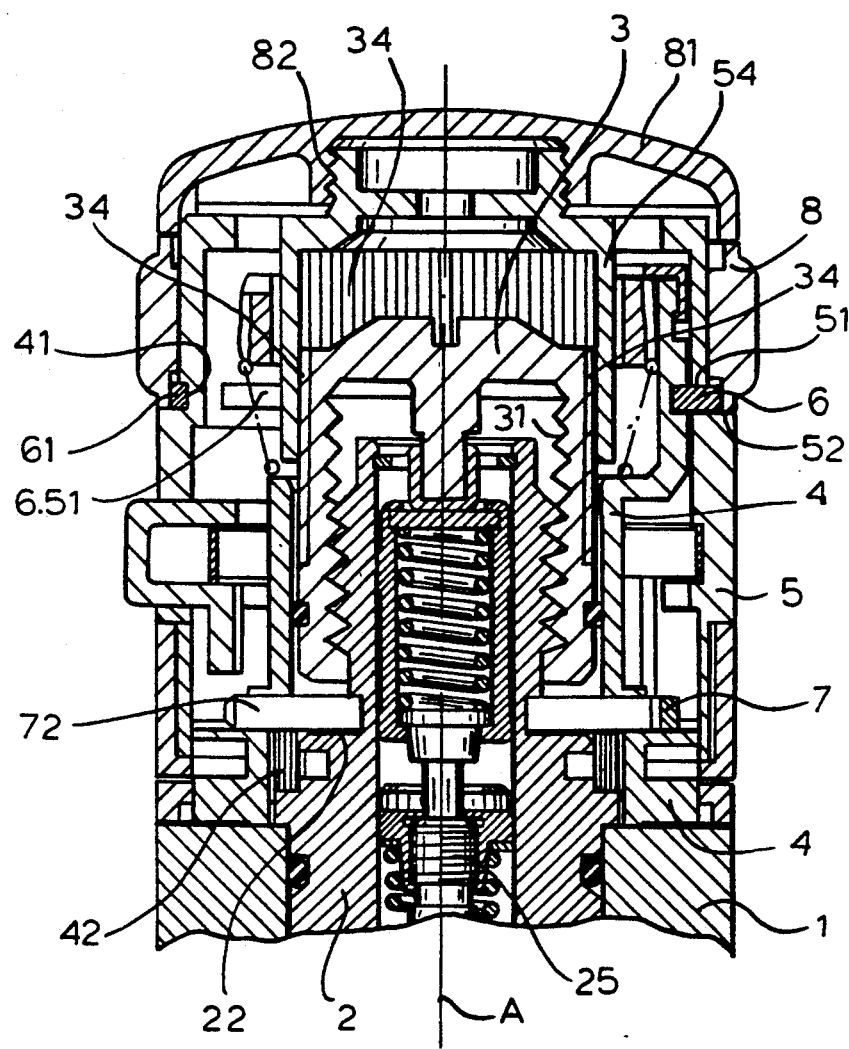
Figure 3:
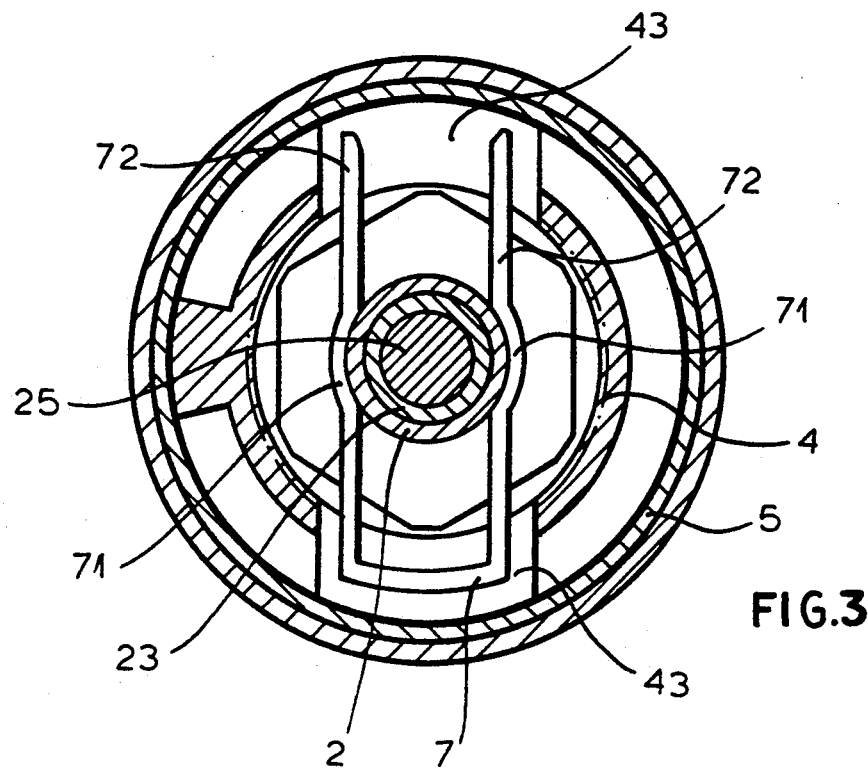
FIG. 3 is a section taken along line III—III of FIG. 1.

As seen in FIGS. 1, 2, 3, and 5, a thermostatically regulated valve has a tubular valve housing 2 centered on an axis A and screwed solidly into a housing 1 to project therefrom. This valve housing 2 has a cylindrical passage 24 centered on the axis A and slidably receiving an axially displaceable actuating stem 25 carrying on its outer end a spring-loaded overload protector 23. The axial position of the stem 25 determines the desired value for the output temperature of the unillustrated mixing valve, with a temperature-sensitive element in the valve regulating this temperature to maintain it at the set level.

A nut 3 is formed internally with a screwthread 31 that is engaged over an external screwthread 21 on the valve housing 2. This nut 3 has an axially extending projection or pusher rod 32 that engages the stem 25 via the overload protector 23 so that when the nut 3 is rotated about the axis A in one direction it pushes the stem 25 down and when rotated oppositely it allows the stem 25 to rise. Thus the nut 3 moves angularly and axially as it is used to adjust the temperature.

Figure 4:
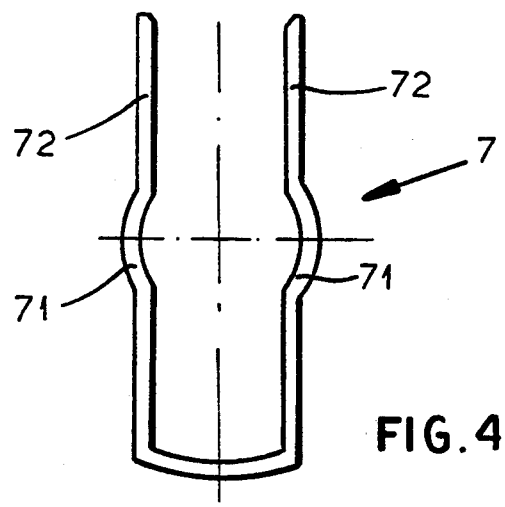
FIG. 4 is a top view of the clip of the knob assembly.
Figure 5:
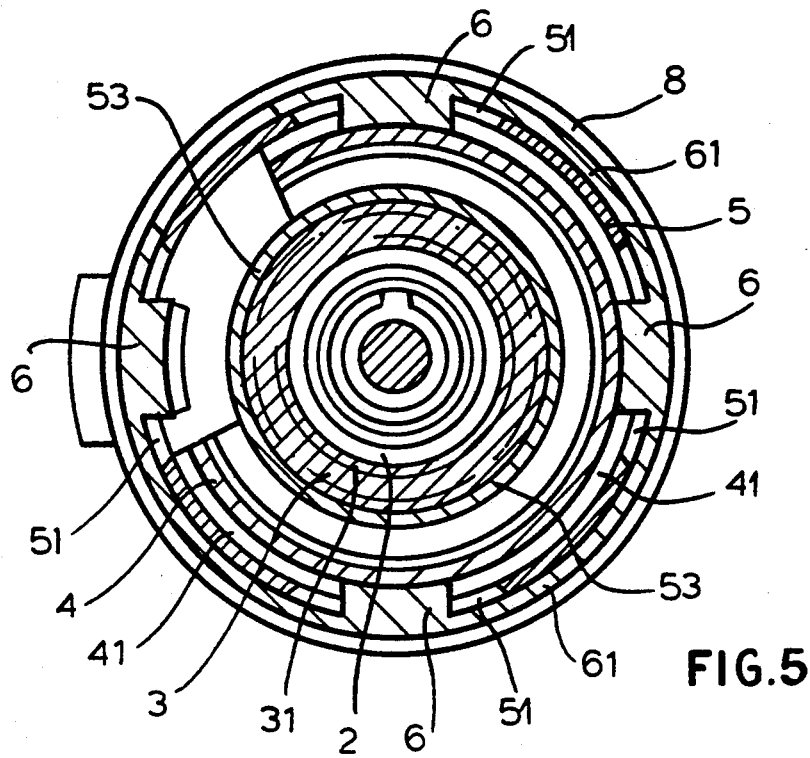
FIG. 5 is a section taken along line V—V of FIG. 1.

An abutment sleeve or sleeve 4 is axially fixed on the valve housing 2 by a clip 7 engaged through a diametrally throughgoing slot or passage 43 and fitting in a circumferential and radially outwardly open groove 22 formed in the valve housing 2. To this end the clip 7 has as shown in FIG. 4 a pair of parallel legs 72 each centrally formed with a part-circular section 71 complementary to the valve housing 2 at the groove 22. In addition the sleeve 4 has axially extending spline ridges 42 that engage complementary ridges 26 formed on the outer surface of the valve housing 2. Thus the interengaging formations 42 and 26 rotationally lock the sleeve 4 on the valve housing 2 and the clip 7 axially locks them together. This sleeve 4 carries angularly spaced abutments that define the limits of adjustment of the valve.

Figure 6:
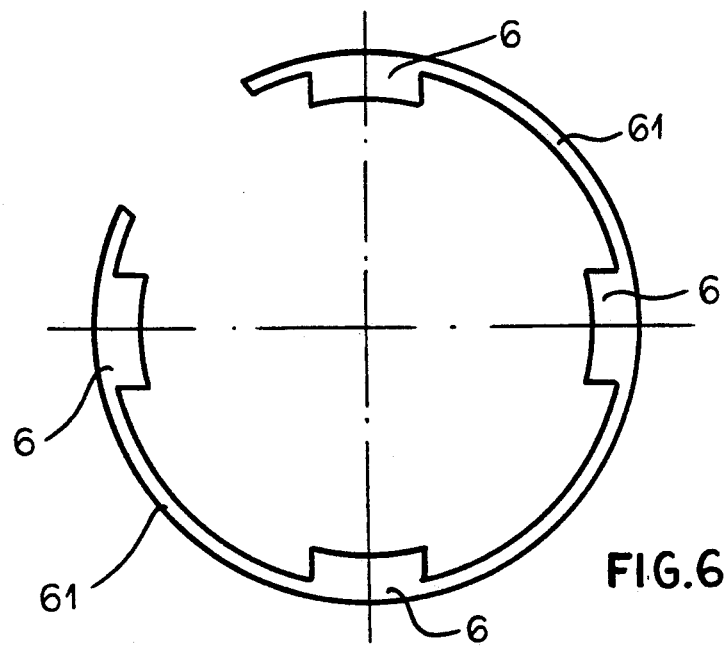
FIG. 6 is a top view of the retaining ring of the assembly.

A knob 5 centered on the axis A has a central tubular portion 54 formed internally with axially extending ridges and grooves 55 that mate with complementary spline formations 34 on the outside surface of the nut 3 so that this knob 5 is rotationally coupled to the nut 3 but can move axially relative to it. It forms an axially rearwardly or upwardly directed shoulder 52 on which sits a cover ring 6 (See FIG. 6) having four angularly equispaced and radially inwardly projecting retaining tabs 6 that each engage through a respective angularly extending slot 51 formed in the knob 5 and engage in a radially outwardly open groove 41 formed in the abutment ring or sleeve 4. Thus the retaining ring 61 axially holds the knob 5 down on the sleeve 4 while still permitting the knob 5 to rotate relative to the sleeve 4. The coupling formed by the interengaging splines 34 and 55 ensures that rotation of the knob 5 will be transmitted to the nut 3 while axial movement of this nut 3 will not affect the knob 5.

A cover ring or sleeve 8 sits on the shoulder 52 and covers up the retaining ring 61 and a cap 81 is threaded at 82 to the upper end of the knob 5 to retain this ring 8 in place. Thus the ring 8, cap 81, and knob 5 will all be one integral unit, rotating together. The clip 7 will be concealed as well as the retaining ring 61, so that the assembly will form a very neat unit.

To assemble the above-described structure, first the knob 3 is screwed down onto the valve housing 2 and then the abutment sleeve 4 is pushed down so that its diametral passage 43 is axially level with the stem groove 22. Then the clip 7 is engaged through the passage 43 around the valve housing 2 at the groove 22. The knob sleeve 5 is then fitted down over the nut 3 and the retaining ring 61 is snapped into place to axially lock the parts 4 and 5 together and conceal the clip 7. Then the cover ring 8 is slipped over the knob 5 to conceal the retaining ring 61 and the cap 81 is screwed into place to lock the ring 8 in place.

Disassembly is done by carrying out the above-detailed steps in reverse.

We claim:

1. In combination with a thermostatically regulated mixing valve having a housing extending along an axis and a stem in the housing axially displaceable to adjust the thermostatically regulated temperature of the valve, a control assembly comprising:

a nut threaded on the housing, axially linked to the valve stem, and rotatable about the axis in one direction to move axially inward and move the stem axially inward and rotatable in the opposite direction to move axially outward and move the stem axially outward;

an abutment sleeve engageable over the valve housing and formed with a radially outwardly open passage;

interengaging on the abutment sleeve and valve housing rotationally coupling same together, the housing being formed in the sleeve with a radially outwardly open groove level with the passage;

a clip engageable through the passage with the groove and axially coupling the sleeve to the valve housing;

a sleevelike knob engaged over the nut and abutment sleeve and formed with a radially throughgoing aperture, the abutment sleeve being formed level with the aperture with a radially outwardly open seat;

interengaging formations on the knob and on the nut rotationally coupling same together but permitting relative axial movement, whereby the knob rotates with the nut but does not move axially therewith; and a retaining element engaged radially in the aperture of the knob and in the seat of the adjustment sleeve and retaining the adjustment sleeve and knob against relative axial displacement.

2. The valve control assembly defined in claim 1 wherein the clip is made of wire and has two elastically deformable legs that embrace the valve housing.

3. The valve control assembly defined in claim 2 wherein the wire clip has two legs formed with concavely confronting arcuate portions that complementarily embrace the valve housing.

4. The valve control assembly defined in claim 1 wherein the retaining element is part of a flexible split ring formed with a plurality of such retaining elements projecting radially inwardly from the split ring, the knob being formed with respective radially throughgoing slots for the retaining elements.

5. The valve control assembly defined in claim 4 wherein the retaining elements and ring are unitarily formed of a synthetic resin.

6. The valve control assembly defined in claim 4 wherein the knob includes a cover engaging over and around the retaining ring.

7. The valve control assembly defined in claim 4 wherein the seat is an annular radially outwardly open groove formed in the sleeve.

8. The valve control assembly defined in claim 1 wherein the retaining element and clip are contained in and concealed by the knob.

9. The valve control assembly defined in claim 1 wherein the knob includes a cover ring engaged over the ring and knob and covering the retaining element, and a cover cap releasably fixed to the knob and pressing the cover ring down onto the knob.

10. In combination with a thermostatically regulated mixing valve having a tubular housing extending along an axis and a stem in the housing axially displaceable to adjust the thermostatically regulated temperature of the valve, a control assembly comprising:
- a nut threaded on the housing, axially linked to the valve stem, and rotatable about the axis in one direction to move axially inward and move the stem axially inward and rotatable in the opposite direction to move axially outward and move the stem axially outward;
- an abutment sleeve engageable over the valve housing and formed with a diametrally throughgoing passage;
- interengaging splines on the abutment sleeve and valve housing rotationally coupling same together, the housing being formed in the sleeve with a radially outwardly open groove axially level with the passage;
- a spring clip engageable through the passage with the groove and axially coupling the sleeve to the valve housing;
- a sleevelike knob engaged over the nut and abutment sleeve and formed with a plurality of angularly spaced and radially throughgoing apertures, the abutment sleeve being formed level with the apertures with a radially outwardly open groove;
- interengaging splines on the knob and on the nut rotationally coupling same together but permitting relative axial movement, whereby the knob rotates with the nut but does not move axially therewith; and
- a retaining ring engaged around the knob and having respective radially inwardly projecting retaining tabs engaged radially through the respective apertures of the knob into the groove of the adjustment sleeve and retaining the adjustment sleeve and knob against relative axial displacement.

* * * * *